July 7, 1970 H. P. A. GFELLER 3,519,758

FEED-IN METHOD FOR SIGNALLING FREQUENCIES

Filed April 27, 1967

United States Patent Office 3,519,758
Patented July 7, 1970

3,519,758

FEED-IN METHOD FOR SIGNALLING FREQUENCIES

Hans Peter Albert Gfeller, Kilchberg, Switzerland, assignor to International Standard Electric Corporation, New York, N.Y., a corporation of Delaware Filed Apr. 27, 1967, Ser. No. 634,173
Claims priority, application Switzerland, Apr. 28, 1966, 6,180/66
Int. Cl. H04q 9/12
U.S. Cl. 179—84 2 Claims

ABSTRACT OF THE DISCLOSURE

A feed-in method for signalling frequencies intended for carrier frequency equipments using in-band voice frequency signalling to fulfill special requirements, i.e. predetermined attenuation, no series contacts in the speech and signalling paths, contact resistances of a few ohms admissible for parallel contacts. The circuit arrangement for carrying out this method is characterized by using a quite normal hybrid coil in an unusual manner.

Figure 1:
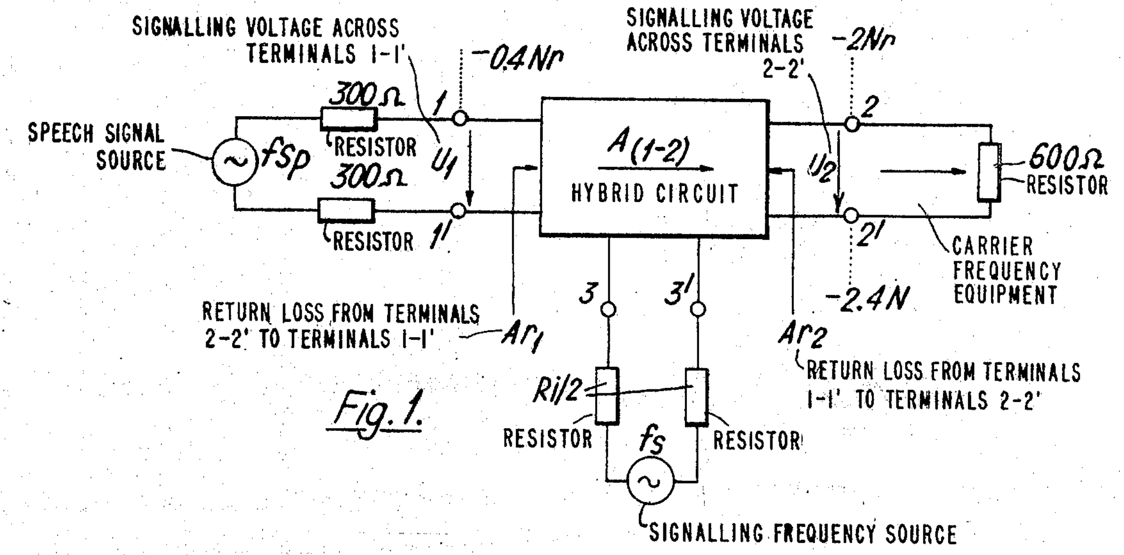

The present invention relates to a feed-in method for signalling frequencies and to a circuit arrangement for carrying out said method.

In the most carrier frequency telephone systems the signalling information is transmitted as a keyed voice frequency signal (e.g. 3,000 cs. or 2,280 cs.) within the speech band. For feeding-in the signalling information, i.e. the signalling frequency, a circuit arrangement is used which has to fulfill different requirements and which has usually two different switching conditions. If the speech path is connected-through, a predetermined attenuation for the speech path should not be exceeded. The signalling frequency should be attenuated as much as possible, because the signalling frequency is within the speech band and acts as noise voltage. If the signalling path is connected-through, the signalling frequency should be attenuated as little as possible, but the speech frequencies as much as possible so that speech signals in the signalling frequency range cannot influence the signalling information. The use of series contacts in the speech path should be avoided and it is desirable to have no series contacts in the signalling path. For parallel contacts a contact resistance of a few ohms should be admissible.

It is therefore an object of the present invention to provide a method of feeding-in signalling frequencies which fulfills the abovementioned requirements with a minimum number of contacts.

The method according to the invention is characterized in that a signalling frequency source and an outgoing line are respectively connected to the subdivided primary winding of a hybrid coil. A speech frequency source is connected to the secondary winding. For connecting-through the signalling path, the secondary winding is short-circuited by a contact so that the transmission of the signalling frequency from the signalling frequency source to the outgoing line is performed by transmitting the signalling frequency from a first portion of the primary winding through the short-circuited secondary winding to a second portion of the primary winding. For connecting-through the speech path, the signalling frequency input of the hybrid coil is short-circuited by a contact arranged behind a terminal impedance, as seen from the hybrid coil, so that the speech signal is subjected to the normal attenuation of a hybrid coil termination. The remainder of the signalling frequency signal, which is present at the signalling input due to the contact resistance of a few ohms of the last-named contact, is transmitted to the outgoing line with the high attenuation inherent to the balanced hybrid coil for this transmission direction.

The circuit arrangement according to the invention for carrying out said method comprises a speech signal source, a signalling frequency source, a hybrid coil having a subdivided primary winding and a secondary winding, a first contact parallel to the secondary winding which contact is closed in the signalling condition, a second contact across the signalling frequency source which contact is closed in the speech condition, and resistors in the connections of the signalling source to ensure that the hybrid coil is terminated with the correct impedance when the second contact is closed.

Figure 2:
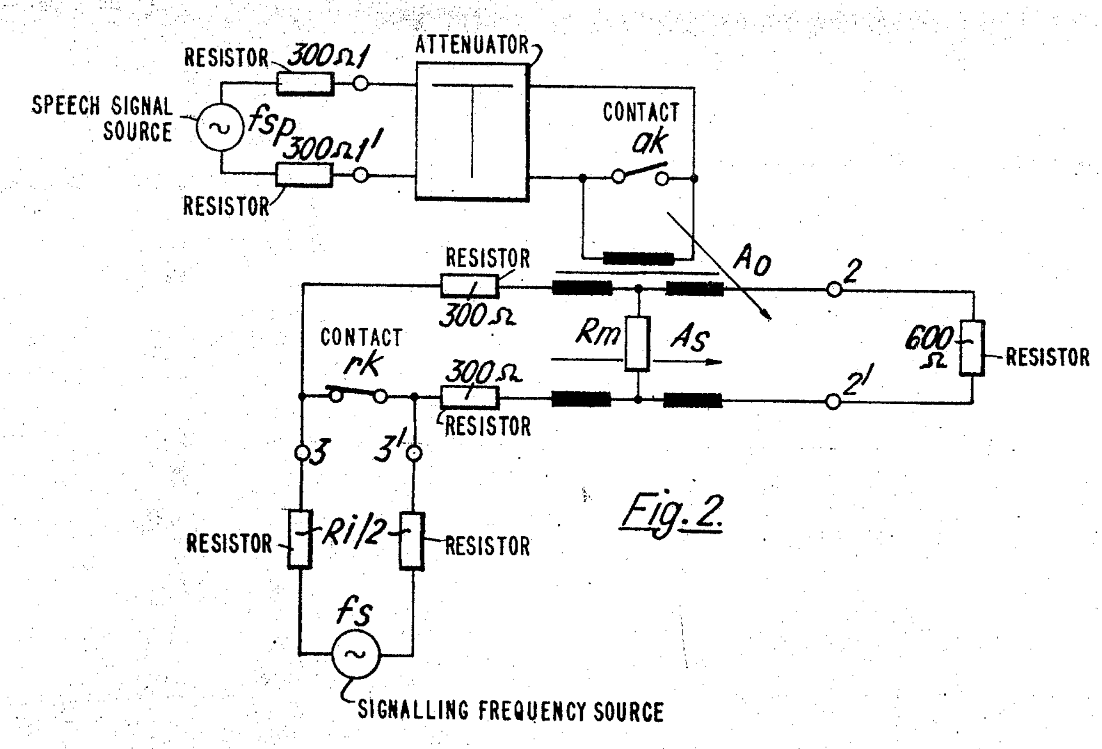

The invention will be best understood from the following description of an embodiment in conjunction with the accompanying drawing in which:

FIG. 1 represents a schematic diagram for the feeding-in of the signalling frequency; and FIG. 2 represents a diagram of the circuit arrangement for feeding-in the signalling frequency.

FIG. 1 represents the schematic diagram for the feeding-in of the signalling frequency together with the respective levels. The speech signal source is connected to the terminals 1–1′, the signalling frequency source to the terminals 3–3′ and the outgoing line to the terminals 2–2′. $U_1$ and $U_2$, respectively, are the signalling frequency voltages at the terminals 1–1′ and 2–2′, respectively. The return losses at the terminals 1–1′ and 2–2′, respectively, are indicated by $Ar_1$ and $Ar_2$, respectively, the composite losses are indicated by A.

The task of the feeding-in circuit arrangement indicated by a rectangle is to feed-in the signalling frequency $f_s$ from a signalling frequency source delivering a limited power in such manner into the speech path that, as the main requirement, the signalling frequency has the desired level (e.g. 2.4N*r*); N*r* is the relative power level in Nepers and is the fundamental unit for characterizing a transmission system representing the absolute level at any point of the system if a VF signal of 800 Hz. having a power of 1 mw$\cong 0Nm$ is applied to the so-called origin of the system, i.e., to the two-wire point of the exchange at the terminals 2–2′ of the outgoing line, i.e. at the input terminals of the carrier frequency equipment, but the following secondary requirements should also be fulfilled:

General requirements: Minimum number of relay contacts;

No series contacts in the speech path;

Admissible contact resistance at least 5 ohms.

Signalling condition, e.g., contact *rk* open and contact *ak* closed, indicated by the index *b*:

$$U_{1b} \leq -5.4Nm \text{ (4.6}N\text{ suppression)}$$

$$A_{(1-2)b} \geq A_{(1-2)a} + 4.6N$$

$$Ar_{1b} \geq 1.6N$$

Speech condition, e.g., contact *rk* closed and contact *ak* open, indicated by the index *a*:

$A_{(1-2)a} = 1.6$ $U_{1a} \leq 0.115$ mvp., $U_{2a} \leq 0.023$ mvp. } corresponding to a noise power of 50 pw. at the release level zero, psophometric value $Ar_{1a} \geq 2.3\ N$ $Ar_{2a} \geq 1.6\ N$ wherein $U_1$ is the signalling voltage across terminals 1–1′; N*m* is the absolute power level in Nepers respective to one milliwatt (1 mw.$\cong 0\ Nm$); $A_{(1-2)}$ is the overall loss for the speech signal from terminals 1–1′ to terminals 2–2′; $Ar_1$ is the return loss in Nepers from terminals 2–2′ to terminals 1–1′; mvp. is millivolts, psophometrically weighted; pw. is picowatts 1 pw.$=10^{-12}$watt); $U_2$ is the signalling voltage across terminals 2–2'; and $Ar_2$ is the return loss from terminals 1–1' to terminals 2–2'.

FIG. 2 represents the selected circuit arrangement to fulfill the abovementioned requirements. The terminals are indicated in the same manner as in FIG. 1. The circuit diagram shows that a known hybrid coil is used for feeding-in the signalling frequency, but that the sources and the ougoing line are not connected thereto in the usual manner.

The speech signal source is connected to the terminals 1–1' and through an attenuation network to the secondary winding of the hybrid coil which secondary winding can be short-circuited by the contact *ak*. The signalling frequency source is connected to the terminals 3–3', which can be short-circuited by the contact *rk*, and through two resistors, each of 300 ohms, to the primary windings. The line outgoing in the direction to the carrier frequency equipment is connected to the terminals 2–2' which are connected with the primary windings.

In the signalling condition (contact *rk* open, contact *ak* closed) the hybrid termination transmits, due to the closed contact *ak*, with an attenuation $A_{Sb}=2A_o$ (wherein $A_{sb}$ is the overall loss for the signalling frequency from terminals 3–3' to terminals 2–2' when in the signalling condition and $A_o$ is the overall loss of a hybrid circuit operated in the normal manner, i.e., a transmission is effected from 1–1' to 2–2' or from 1–1' to 3–3' or vice versa). Thus twice the normal composite loss has to be put up. With a few ohms contact resistance of the closed contact *ak* a small additional attenuation arises. The remainder of the signalling voltage produced across the contact resistance is sufficiently small to fulfill the abovementioned requirement $U_{1b} \leqslant -5.4$ *Nm.*

In the speech condition (contact *rk* closed, *ak* open) all sides of the hybrid termination are correctly terminated and said termination has, with a suitable choice of R*m*, a high blocking attenuation $A_{Sa} > 3N$ in the transmission direction from 3–3' to 2–2' so that the remainder of the signalling frequency arising with a few ohms contact resistance of the contact *rk* at the terminals 3–3' is suppressed to such an extent that the abovementioned requirements for $U_{1a}$ and especially for $U_{2a}$ can be fulfilled.

What is claimed is:

1. A circuit arrangement for feed-in signalling frequencies, comprising a signalling frequency source and an outgoing line respectively connected to a subdivided primary winding of a hybrid coil, a speech frequency source connected to a secondary winding, means for connecting-through a signalling path, contact means for short-circuiting said secondary winding, means for transmitting the signalling frequency from the signalling frequency source to the outgoing line by transmitting the signalling frequency from a first portion of the primary winding through the short-circuited secondary winding to a second portion of the primary winding, means for connecting-through the speech path, contact means for short-circuiting the signalling frequency input of the hybrid coil, said contact means being positioned behind a terminal impedance as seen from the hybrid coil, whereby the speech signal is subjected to the normal attenuation of a hybrid coil termination, and means for transmitting the remainder of the signalling frequency signal, which is present at the signalling input due to the contact resistance of the lastnamed contact, to the outgoing line with the attenuation of the balanced hybrid coil for this transmission direction.

2. A circuit arrangement for signalling frequencies comprising a speech signal source, a signalling frequency source, a hybrid coil having a subdivided primary winding and a secondary winding, a first contact parallel to the secondary winding, means responsive to a signalling condition for closing said contact a second contact across the signalling frequency source, means responsive to the speech condition for closing said second contact, and resistor means in the connections between the signalling source and the hybrid coil to terminate said coil with the correct impedance when the second contact is closed.

References Cited

UNITED STATES PATENTS 3,313,886 4/1967 Vogel ---------------- 179—16

KATHLEEN H. CLAFFY, Primary Examiner

W. A. HELVESTINE, Assistant Examiner